July 27, 1954     T. A. LJUNGBERG     2,684,534

MEASURING DEVICE

Filed April 27, 1951

Inventor
Ture A. Ljungberg
By Young, Emery & Thompson
Attys.

Patented July 27, 1954

2,684,534

UNITED STATES PATENT OFFICE 2,684,534

MEASURING DEVICE

Ture Anders Ljungberg, Stuvsta, near Stockholm,
Sweden

Application April 27, 1951, Serial No. 223,414

5 Claims. (Cl. 33—138)

1

The present invention relates to measuring devices of the type comprising a flexible steel measuring tape of concave-convex cross-section adapted to be coilably received within a casing.

According to the present invention a channel-shaped guide is provided for said tape adjacent the opening therefor in the casing, the tape being adapted to slide with negligible friction in said guide when in its natural concave-convex shape, and manually controllable means being provided for flattening the curved profile of the tape so as to urge the edges of the tape firmly against the lateral portions of the guide for locking the tape against sliding movement therein.

The invention is illustrated by way of example in the accompanying drawing in which.

Figure 3:
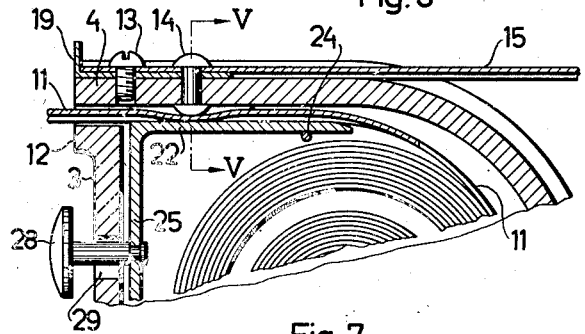
Fig. 3 is a sectional view showing a portion of Fig. 1 on a larger scale.
Figure 5:
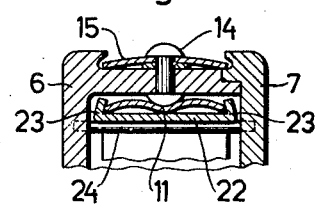
Figure 7:
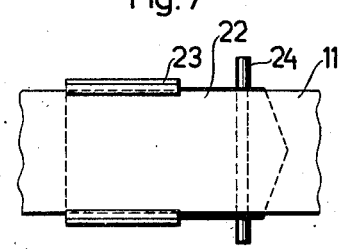
Figure 6:
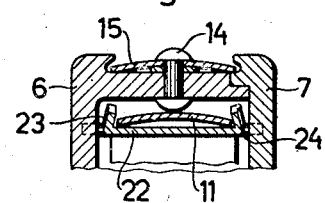
Figure 8:
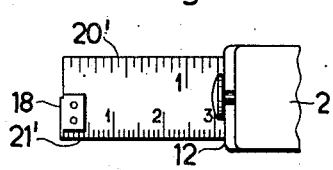
Figure 9:
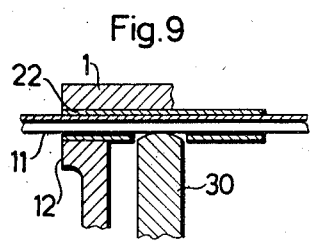
Figure 10:
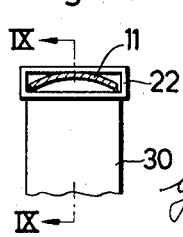

Figs. 5 and 6 are transverse sections on line V—V of Fig. 3 with the measuring tape in the locked and in the unlocked position, respectively, Fig. 7 is a plan view of a guide in which the measuring tape slides, Fig. 8 is a bottom plan view showing the underside of the measuring tape and the graduations thereon, Fig. 9 is a sectional view taken on line IX—IX of Fig. 10, and Fig. 10 is a front end view of the mouth portion of a modified form of the measuring device.

In the drawing I designates a casing which may be shaped substantially as shown, having three plane side walls 2, 3 and 4 and a fourth side wall 5 which is circular, or curved. In the casing which consists of a box portion 6 and a cover 7 there is a central stud 8 having a transverse slot 9 in which one end of a resiliently coiled winding strip 10 is secured, the other end of said strip being fastened to the inner end of a flexible coiled steel measuring tape or rule member 11 of the concave-convex type, compare also Fig. 6, said tape being extendable through an opening or mouth portion 12 arranged near that corner of the casing which is formed by the two flat side walls 3 and 4.

To the flat upper side wall 4 of the casing there is secured a short flexible steel strip 15, as by means of a screw 13 and a rivet 14 (Fig. 3), said steel strip 15 being also of the concave-convex

Figure 1:
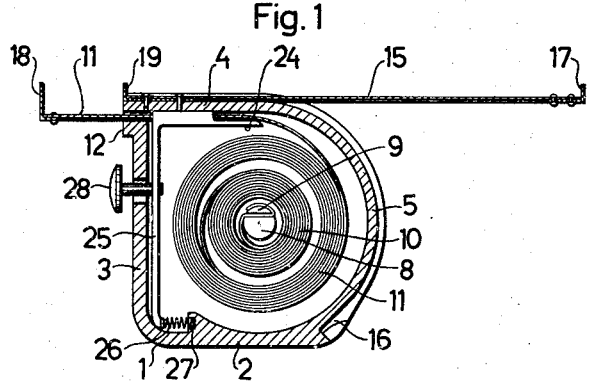
Fig. 1 is a sectional view taken on line I—I of Fig. 4.
Figure 4:
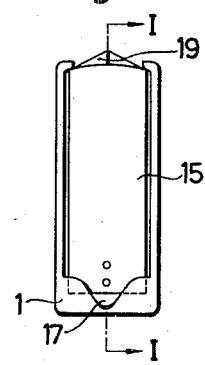
Fig. 4 is a right hand end view of the device shown in Fig. 1.

2 type and intended, when not in use, to lie close against the curved side wall 5 of the casing with its free end engaging a pocket 16 formed in the casing (see Fig. 4). When the end of the steel strip 15 is moved out of the pocket 16 this strip assumes a straight or rod-like form, as shown in Fig. 1, and in this latter form it extends in a direction opposite to that of the extended portion of measuring tape 11 and substantially in alignment therewith.

The short steel strip 15 as well as the measuring tape or rule member 11 are provided with pointed hooks or lips 17 and 18, respectively, which may be riveted to said strip and tape, and a similar pointed hook or lip 19 is secured to the casing 1 in the plane through the end surface of the mouth portion 12. This last mentioned lip 19 may be fastened to the casing by means of the same screw and rivet 13 and 14, respectively, that hold the steel strip 15.

Figure 2:
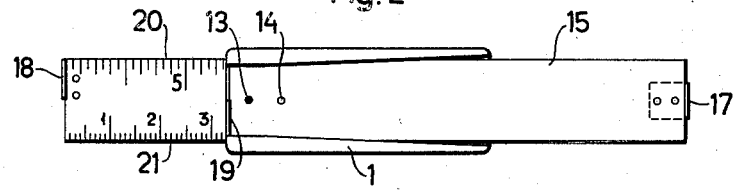
Fig. 2 is a plan view of the device shown in Fig. 1.

The steel strip 15 usually has no graduation and the length thereof between the lips 17 and 19 preferably amounts to 4 inches or to 100 mm. depending upon whether it is desired to make the measurements generally in feet and inches or in meters and centimeters. If the length amounts to 4 inches the measuring tape 11, preferably on its upper side as shown in Fig. 2, has a graduation 20 in inches beginning with the 4-inch subdivision so that the readings taken at the plane through the lip 19 correspond to the distance in inches between the two outer lips 17 and 18.

In addition to the graduation 20 in inches the upper side of the rule member 11 may also be provided with a graduation 21 in centimeters this graduation being likewise compensated for the length of the steel strip 15 thus beginning with the subdivision 10.16 cm. The readings in centimeters taken at the plane through the lip 19 therefore will correspond to the distance in centimeters between the two outer lips 17 and 18.

If, on the other hand, the length of the steel strip 15 between the lips 17 and 19 amounts to 100 millimeters the metric graduation 21 on the upper side of the measuring tape 11 should begin with the 10 centimeter subdivision and the graduation 20 in inches should begin with 3.937 inches.

On the underside the rule member 11 may likewise be provided with graduations 20' and 21' (Fig. 8) in inches and in centimeters, these graduations beginning at zero, so that readings taken at the plane through the end surface of the mouth portion 12 will indicate the distance in inches and centimeters between the two lips or hooks 18 and 19.

It will be understood that the device as described above can be used with advantage for taking outside and also inside measurements, the inside measurements being taken either between the lips 18 and 19 or between the lips 18 and 17, if the steel strip 15 has been extended. Since both the measuring tape 11 and the steel strip 15 are flexible they may be bent at right angles so as to extend upwards from the casing 1 in substantially parallel relationship to facilitate insertion of the measuring device into a hollow article having a narrow mouth when it is desired to make inside measurements therein.

It will be obvious that a measuring device of the type described above requires an effective locking device for the slidable measuring tape 11 so that the same cannot be displaced, for instance after an inside measurement has been taken and the measuring device must be moved out through a narrow mouth in order to make the reading on the graduation.

Such a locking device may be constructed substantially as follows:

In the casing 1 adjacent the mouth portion 12 the measuring tape 11 runs through a channel-shaped guide consisting of a rectangular plate 22, two parallel edges of which are turned upwards and somewhat inwards, as shown at 23, 23 in Figs. 5 and 6, so as to form a channel for the measuring tape 11. Adjacent its inner end the plate 22 is fixed to a transverse shaft 24 which is rotatably mounted in the end walls of the casing 1. At its outer end the plate 22 has connected to it a rod 25 extending downwards adjacent the side wall 3 of the casing 1 and substantially parallel to the same. Between the lower end of the rod 25 and an inner projection 27 on the lower wall 2 of the casing there is arranged a helical spring 26 which tends to turn the rod 25 and the guide 22, 23 clockwise about the shaft 24, as viewed in Figs. 1 and 3. The channel-shaped guide member 22, 23 is mounted within the casing 1 adjacent its mouth portion and has an inside channel width slightly smaller than that of the measuring tape when flattened and the inside walls of the channel each form a substantial angle with the general plane of the channel.

To the rod 25 there is attached a button 28, extending through an aperture 29 in the side wall 3 of the casing 1.

In the embodiment shown the measuring tape 11 has its convex side turned upwards, and under the action of the spring 26 which tends to rotate the guide 22, 23 clockwise the portion of the tape 11 which is located in this guide 22, 23 is urged against the inner head of the rivet 14 whereby the convex shape of the tape is flattened out more or less (compare Fig. 5) so that the edges of the tape are firmly pressed against the side walls 23 of the guide. This causes the tape to be very effectively locked in the guide so that moving the tape after it has been locked would require heavy forces.

If it is desired to adjust the length of the extended measuring tape 11 in order to make a measurement the button 28 is depressed. This causes the guide 22, 23 to be swung anti-clockwise about its shaft 24 so that the tape 11 in the guide is moved away from the head of the rivet 14 and the tape assumes its normal profile in which it slides easily in the guide.

Modifications of the locking device for the measuring tape are conceivable within the scope of the appended claims. Thus the guide 22 may be fixedly connected to the casing 1 as shown in Figs. 9 and 10, a member 30 being provided which may be moved towards the tape 11 in order to flatten its curved profile and to lock the same in the guide. Although preferably the locking means are spring-actuated in one direction, as shown, this is not necessary, it being also possible to arrange said means for manual operation in both directions.

What I claim is:

1. A measuring device comprising a casing provided with a mouth portion, a flexible steel measuring tape of the concavo-convex type coiled within said casing and being movable through said mouth portion, a channel-shaped guide member mounted within the casing adjacent its mouth portion and of an inside channel width slightly smaller than that of the measuring tape when flattened and in which the measuring tape is slidable with negligible friction when in its normal concavo-convex shape, said guide member being held against movement in the casing at least in the longitudinal direction of the measuring tape, elastic means to normally exert a pressure on the measuring tape adjacent the guide member in the transverse direction thereof to flatten its concavo-convex shape and urge its edges against the side walls of the channel-shaped guide member, the inside walls of said channel each forming a substantial angle with the general plane of the channel for effectively locking the measuring tape when so flattened against longitudinal movement in both directions relatively to said guide member and said casing, and manually operable means for neutralizing the effect of the elastic means to permit the measuring tape to reassume its concavo-convex shape when it is desired to move the same in the guide member.

2. A measuring device comprising a casing provided with a mouth portion, a flexible steel measuring tape of the concavo-convex type coiled within said casing and being movable through said mouth portion, a channel-shaped guide member mounted within the casing adjacent its mouth portion and in which the measuring tape is slidable with negligible friction when in its normal concavo-convex shape, said guide member being held against movement in said casing in the longitudinal direction of the measuring tape but being movable in a direction transversely to the first mentioned direction, an abutment provided in the casing opposite the channel-shaped guide member, a spring to normally urge the guide member with the tape towards said abutment so that the latter flattens the concavo-convex shape of the tape and urges its edges against the side walls of the guide member, the inside walls of said channel each forming a substantial angle with the general plane of the channel for effectively locking the measuring tape when so flattened against longitudinal movement in both directions relatively to said guide member and said casing, and manually operable means for neutralizing the effect of the spring to permit the measuring tape to reassume its concavo-convex shape when it is desired to move the same in the guide member.

3. A measuring device according to claim 2, in which the channel-shaped guide member is rotatably mounted in the casing adjacent one end, the other end of said guide member carrying an arm which is actuated by the said spring in a direction for urging the guide member and the tape therein against said abutment to flatten the concavo-convex shape of the tape, and said arm being provided with a button extending through an aperture in the casing and serving to urge the guide member with the tape in the opposite direction against the action of the spring.

4. A measuring device comprising a casing provided with a mouth portion, a flexible steel measuring tape of the concavo-convex type coiled within said casing and being movable through said mouth portion, a channel-shaped guide fixedly connected to said casing adjacent its mouth portion, and of an inside channel width slightly smaller than that of the measuring tape when flattened and in which the measuring tape is slidable with negligible friction when in its normal concavo-convex shape, elastic means to normally exert a pressure on the measuring tape adjacent the guide member in the transverse direction thereof to flatten its concavo-convex shape and urge its edges against the side walls of the channel-shaped guide member for effectively locking the measuring tape when so flattened against longitudinal movement in both directions relatively to said guide member, the inside walls of said channel each forming a substantial angle with the general plane of the channel, and manually operable means for neutralizing the effect of the elastic means so as to permit the measuring tape to reassume its normal concavo-convex shape when it is desired to move the same in said guide member.

5. A measuring device comprising a casing provided with a mouth portion, a flexible steel measuring tape of the concavo-convex shape coiled within said casing and being movable through said mouth portion, a channel-shaped guide member mounted within said casing adjacent its mouth portion and in which the measuring tape is slidable with negligible friction when in its normal concavo-convex shape, said guide member being held against movement in said casing at least in the longitudinal direction of the measuring tape, elastic means to normally exert a pressure on the measuring tape adjacent the guide member in the transverse direction thereof to flatten its concavo-convex shape and urge its edges against the side walls of the channel-shaped guide member for effectively locking the measuring tape in said guide member against longitudinal movement in both directions relatively to said guide member and said casing, manually operable means for neutralizing the effect of the elastic means to permit the measuring tape to reassume its concavo-convex shape within said guide member, and a short flexible steel strip of concavo-convex shape secured to the outer side of said casing to extend therefrom in a direction opposite to that of the measuring tape, when extended, and substantially in alignment therewith, said steel strip serving to facilitate the taking of inside measurements, said casing being provided with a curved sidewall portion adjacent the said steel strip and with a pocket into which the free end of the steel strip may be inserted when the strip is bent to lie close against said curved wall portion.

References Cited in the file of this patent

UNITED STATES PATENTS

| Number | Name | Date |
|---|---|---|
| 531,047 | Krueger | Dec. 18, 1894 |
| 2,022,756 | Buck et al. | Dec. 3, 1935 |
| 2,132,202 | Carlson | Oct. 4, 1938 |
| 2,142,387 | Udell | Jan. 3, 1939 |
| 2,503,440 | Johanningmeier | Apr. 11, 1950 |
| 2,575,354 | Mills | Nov. 20, 1951 |

FOREIGN PATENTS

| Number | Country | Date |
|---|---|---|
| 113,424 | Great Britain | Feb. 21, 1918 |